(12) United States Patent
Weis

(10) Patent No.: US 8,459,515 B1
(45) Date of Patent: Jun. 11, 2013

(54) SYSTEMS AND ACCESSORY KITS FOR DOLLY CARTS

(76) Inventor: Stephen M. Weis, Ottawa, OH (US)

(*) Notice: Subject to any disclaimer, the term of this patent is extended or adjusted under 35 U.S.C. 154(b) by 111 days.

(21) Appl. No.: 13/223,686

(22) Filed: Sep. 1, 2011

(51) Int. Cl.
*B60R 9/00* (2006.01)

(52) U.S. Cl.
USPC ........ 224/401; 224/545; 224/484; 280/47.19; 280/47.27; 280/47.34; 248/98; 248/129

(58) Field of Classification Search
USPC ................. 224/401, 409, 534, 545, 546, 547, 224/555; 248/98, 99, 129, 150; 280/47.28, 280/47.29, 47.31, 654, 655, 651, 653, 47.131, 280/47.17, 47.18, 47.19, 47.23, 47.24, 47.27, 280/79.11
See application file for complete search history.

(56) References Cited

U.S. PATENT DOCUMENTS

| | | | |
|---|---|---|---|
| 3,756,548 A | 9/1973 | Santarelli et al. | |
| 3,992,034 A * | 11/1976 | Smith et al. | 280/654 |
| 4,124,185 A * | 11/1978 | Preisinger | 248/98 |
| 4,805,858 A | 2/1989 | Taylor | |
| 5,464,183 A * | 11/1995 | McConnell et al. | 248/311.2 |
| 5,465,987 A * | 11/1995 | DellaVecchia | 280/47.28 |
| 6,126,183 A | 10/2000 | Lensing | |
| 6,419,244 B2 * | 7/2002 | Meabon | 280/47.27 |
| D532,176 S | 11/2006 | Ditmars, Jr. | |
| 7,458,600 B1 | 12/2008 | Berke et al. | |
| 2003/0189303 A1 * | 10/2003 | Ciminelli | 280/47.34 |

* cited by examiner

*Primary Examiner* — Nathan J Newhouse
*Assistant Examiner* — Phillip Schmidt

(57) ABSTRACT

A kit for use with a dolly cart comprising a worktable; a garbage receptacle holder comprising a ring component; a wagon; and a V-shaped support bar for rigidly attaching the worktable, the wagon, or the garbage receptacle holder to a frame of the dolly cart, the V-shaped support bar comprises a generally V-shaped bar having a first half, a second half, and a vertex, wherein mounting holes are disposed in the first half and the second half, the holes accommodate a bolt and a wing nut for tightening.

15 Claims, 8 Drawing Sheets

SYSTEMS AND ACCESSORY KITS FOR DOLLY CARTS

FIELD OF THE INVENTION

The present invention is directed to accessories for dolly carts, more particularly to a kit allowing a user to convert a dolly cart to a workbench, a garbage receptacle holder, and/or a cart for hauling behind a vehicle such as a tractor.

BACKGROUND OF THE INVENTION

Dolly carts are commonly used to transport objects from one place to another. The present invention features a kit allowing a user to convert a dolly cart to a workbench, a garbage receptacle holder, and/or a cart for hauling behind a vehicle such as a tractor. The present invention also features unique ways of attaching accessories to the dolly cart. The present invention also features a system, wherein the system comprises the kit installed on a dolly cart.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a kit 100 comprising a worktable 200 comprising a panel 230 and a first support component 240, the first support component 240 is a flange that extends downwardly from a first edge 231 of the panel 230 of the worktable 200, wherein a first mounting hole 458 is disposed in each a first side 241 of the first support component 240 and a second side 242 of the first support component 240, the first mounting holes 458 are adapted to accommodate a bolt 245; a garbage receptacle holder 300 for supporting a garbage receptacle 301 in an open position, the garbage receptacle holder 300 comprises a ring component 310 and a second support component 320, the second support component 320 is a flange that extends downwardly from a first edge 311 of the ring component 310, wherein a second mounting hole 558 is disposed in each a first side 321 of the second support component 320 and a second side 322 of the second support component 320, the second mounting holes 558 are adapted to accommodate a bolt 245; and a V-shaped support bar 250 for rigidly attaching the worktable 200 or the garbage receptacle holder 300 to a dolly cart 101, wherein a third mounting hole 258 is disposed in each a first half 251 and a second half 252 of the V-shaped support bar 250, the third mounting holes 258 are adapted to accommodate a bolt 245.

In some embodiments, the kit further comprises wing nuts 255 for tightening. In some embodiments, a side wall 235 extends upwardly from at least one side edge of the panel 230 of the worktable 200. In some embodiments, a front flap 375 extends downwardly from a second edge 312 of the ring component 310, the second edge 312 being opposite the first edge 311.

In some embodiments, the kit further comprises a second V-shaped support bar 250 and a base support 350, the base support 350 comprises a base support panel 710 and a third support component 720, the third support component 720 is a flange that extends downwardly from a first edge 711 of the base support panel 710, wherein a fourth mounting hole 758 is disposed in each a first side 721 of the third support component 720 and a second side 722 of the third support component 720, the fourth mounting holes 758 are adapted to accommodate a bolt 245.

In some embodiments, the kit further comprises a second V-shaped support bar 250 and a wagon 400, the wagon 400 comprises a main panel 410 and a pair of wheels 430 attached to a bottom surface of the main panel, the wheels 430 are positioned on opposite sides and are positioned near a first end 411 of the main panel 410. In some embodiments, the wagon 400 further comprises a side wall 415 extending upwardly from at least one side edge of the main panel 410. In some embodiments, a handle 450 is pivotally attached to the main panel 410 of the wagon 400.

The present invention also features a system comprising a worktable 200 comprising a panel 230 being generally flat and a first support component 240, the first support component 240 is a flange that extends downwardly from a first edge 231 of the panel 230 of the worktable 200, wherein a first mounting hole 458 is disposed in each a first side 241 of the first support component 240 and a second side 242 of the first support component 240; a V-shaped support bar 250 for rigidly attaching the worktable 200 or the garbage receptacle holder 300 to, a dolly cart 101, wherein a third mounting hole 258 is disposed in each a first half 251 and a second half 252 of the V-shaped support bar 250, the third mounting holes 258 each accommodate a bolt 245; and a dolly cart 101; wherein the V-shaped support bar 250 and the first support component 240 together sandwich rails 105 of the dolly cart 101 and bolts 245 are driven through first the second mounting holes 258 followed by the first mounting holes 458 so as to attach the worktable 200 to the dolly cart 101.

In some embodiments, wing nuts 255 are attached to the bolts 245 for tightening. In some embodiments, a side wall 235 extends upwardly from at least one side edge of the panel 230 of the worktable 200.

The present invention also features a system comprising a garbage receptacle holder 300 for supporting a garbage receptacle 301 in an open position, the garbage receptacle holder 300 comprises a ring component 310 and a second support component 320, the second support component 320 is a flange that extends downwardly from a first edge 311 of the ring component 310, wherein a second mounting hole 558 is disposed in each a first side 321 of the second support component 320 and a second side 322 of the second support component 320; a V-shaped support bar 250 for rigidly attaching the worktable 200 or the garbage receptacle holder 300 to a dolly cart 101, wherein, a third mounting hole 258 is disposed in each a first half 251 and a second half 252 of the V-shaped support bar 250, the third mounting holes 258 each accommodate a bolt 245; and a dolly cart 101; wherein the V-shaped support bar 250 and the second support component 320 together sandwich rails 105 of the dolly cart 101 and bolts 245 are driven through first the third mounting holes 258 followed by the second mounting holes 558 so as to attach the garbage receptacle holder 300 to the dolly cart 101.

In some embodiments, wing nuts 255 are attached to the bolts 245 for tightening. In some embodiments, the system further comprises a second V-shaped support bar 250 and a base support 350, the base support 350 comprises a base support panel 710 and a third support component 720, the third support component 720 is a flange that extends downwardly from a first edge 711 of the base support panel 710, wherein a fourth mounting hole 758 is disposed in each a first side 721 of the third support component 720 and a second side 722 of the third support component 720, the fourth mounting holes 758 are adapted to accommodate a bolt 245, wherein the second V-shaped support bar 250 and the third support component 720 together sandwich rails 105 of the dolly cart 101 and bolts 245 are driven through first the third mounting holes 258 of the second V-shaped support bar 250 followed by the fourth mounting holes 758 so as to attach the base support 350 to the dolly cart 101. In some embodiments, a front flap 375 extends downwardly from a second edge 312 of the ring component 310, the second edge 312 being opposite the first edge 311.

DESCRIPTION OF PREFERRED EMBODIMENTS

Figure 1:
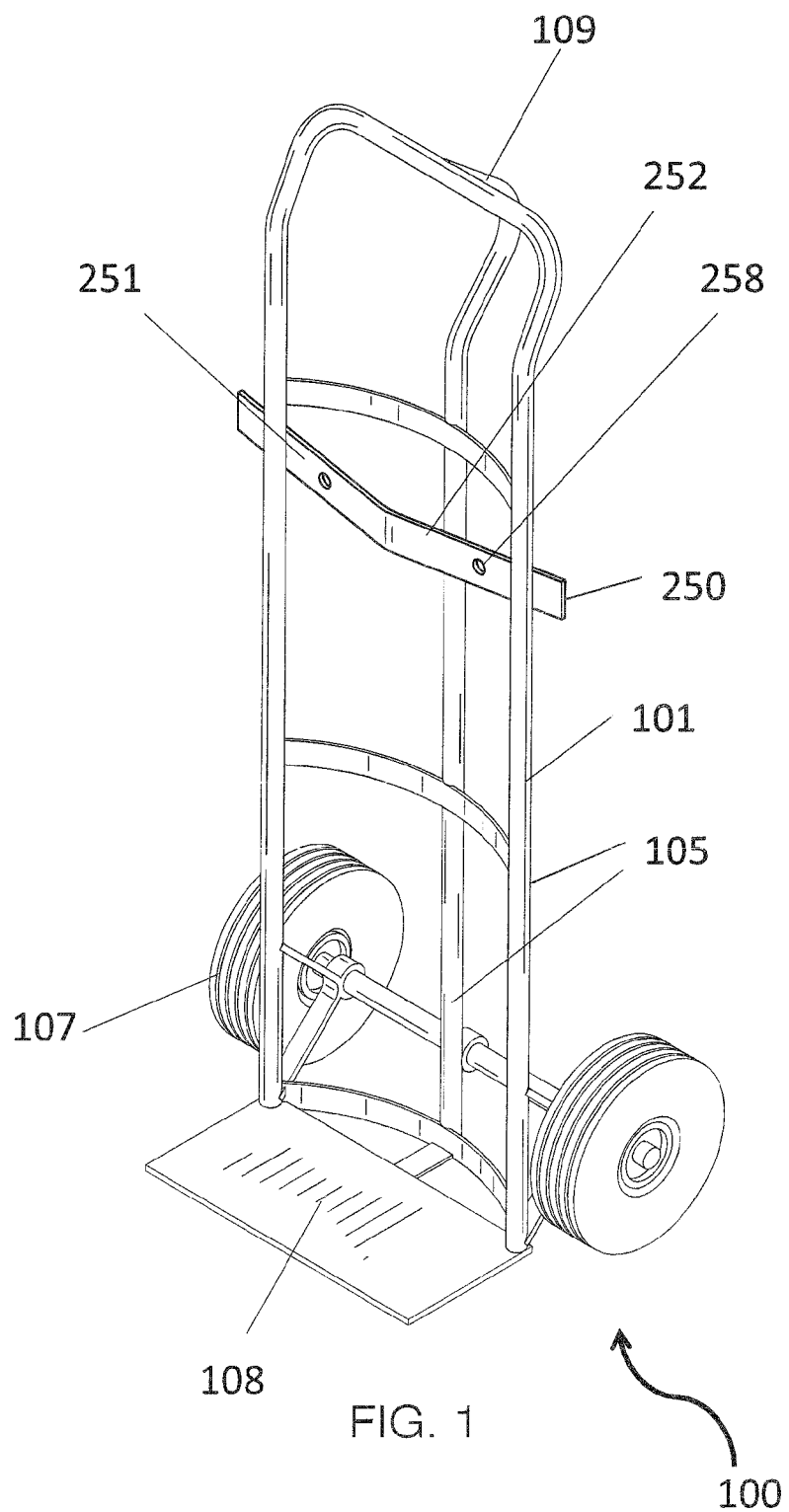
FIG. 1 is a perspective view of a dolly cart to which a V-shaped support bar is attached.

Referring now to FIG. 1, FIG. 2A, FIG. 2B, FIG. 3A, FIG. 3B, FIG. 4A, FIG. 4B, and FIG. 5, the present invention features a kit 100 comprising accessories for attaching to a standard dolly cart 101. In some embodiments, the kit 100 comprises one or more accessories such as a worktable 200, a garbage receptacle holder 300, and/or a wagon 400.

Dolly carts 101 are generally standard and are well known to one of ordinary skill in the art. For example, as shown in FIG. 1, the dolly cart 101 comprises a frame with two or more (e.g., three) vertically oriented rails 105. In some embodiments, the frame (rails 105) is constructed in a curved configuration (see FIG. 1). In some embodiments, the frame (rails 105) is constructed in a flat configuration. The dolly cart 101 further comprises a pair of wheels 107, a base platform 108, and a handle 109.

The kit 100 of the present invention comprises one or more V-shaped support bars 250. As shown in FIG. 1, the V-shaped support bar 250 is attached to the rails 105 of the dolly cart 101. The V-shaped support bar 250 may be generally V-shaped (e.g., see FIG. 1). The V-shaped support bar may be divided into a first half and a second half, the halves joined at a vertex. Without wishing to limit the present invention to any theory or mechanism, it is believed that the V-shaped support bar 250 is advantageous because it allows the worktable 200 or the garbage receptacle holder 300 or the wagon 400 to be attached to a dolly cart that has either a curved frame (as shown in FIG. 1) or a straight frame. The vertex of the V-shaped support bar 250 can go around a middle rail of the dolly cart frame in either configuration (a curved frame dolly cart or a straight frame dolly cart). The V-shaped support bar 250 can be rigidly attached to the worktable 200 or the garbage receptacle holder 300 or the wagon while sandwiching the frame of the dolly cart 101. The V-shaped support bar 250 may also rigidly attach the worktable 200 or the garbage receptacle holder 300 or the wagon 400 to the dolly cart 101 so that the worktable 200 or the garbage receptacle holder 300 or the wagon 400 (respectively) cannot move side-to-side.

In some embodiments, a first mounting hole is disposed in the first half of the V-shaped support bar 250 and a second mounting hole is disposed in the second half of the V-shaped support bar 250. The holes may be adapted to accommodate a securing component (e.g., a bolt, e.g., a bolt and a wing nut 255 for tightening) (e.g., when mounting a worktable 200, a wagon 400, etc.).

Figure 2A:
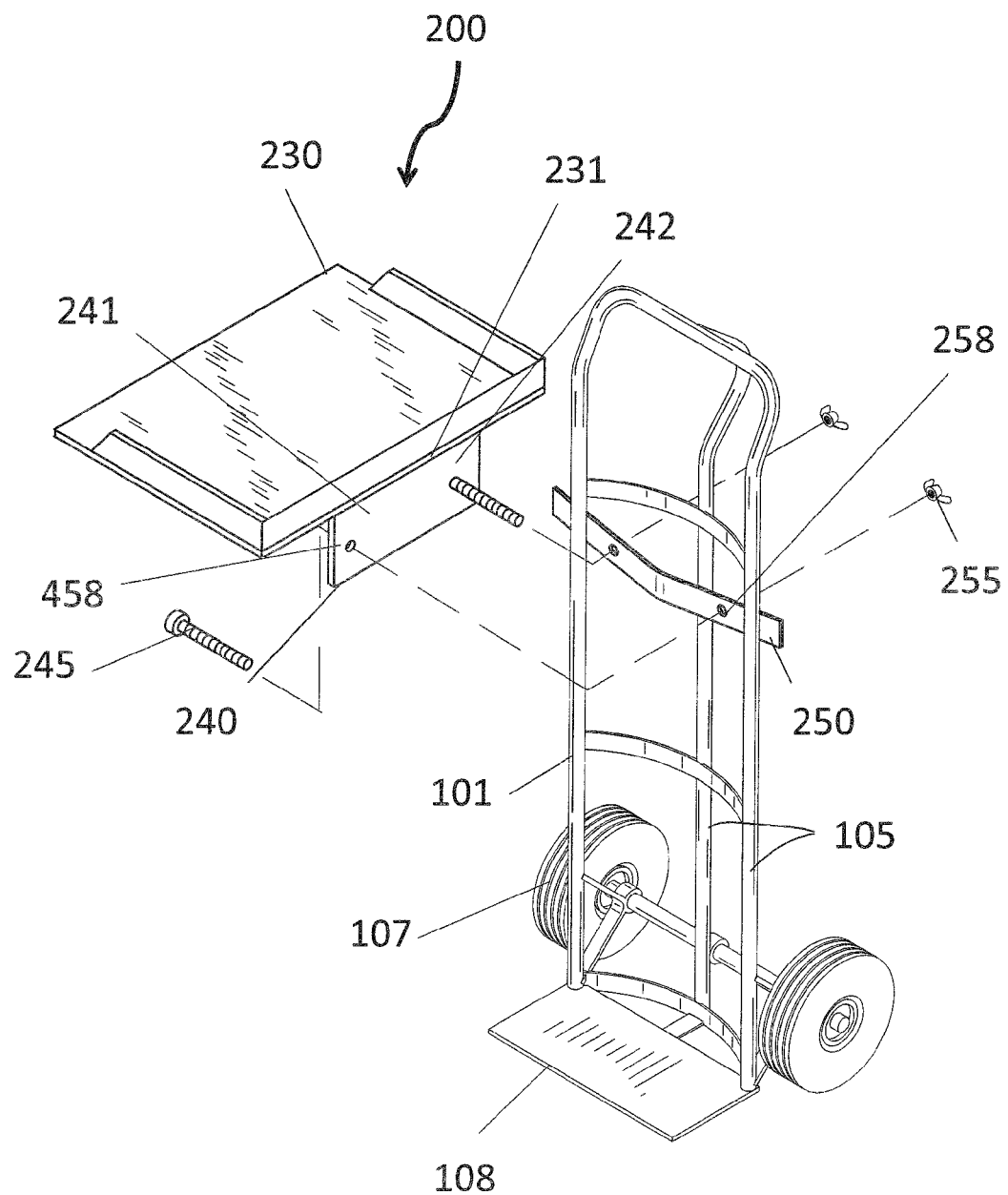
FIG. 2A is an exploded view of a worktable of the kit of the present invention and the dolly cart of FIG. 1.
Figure 2B:
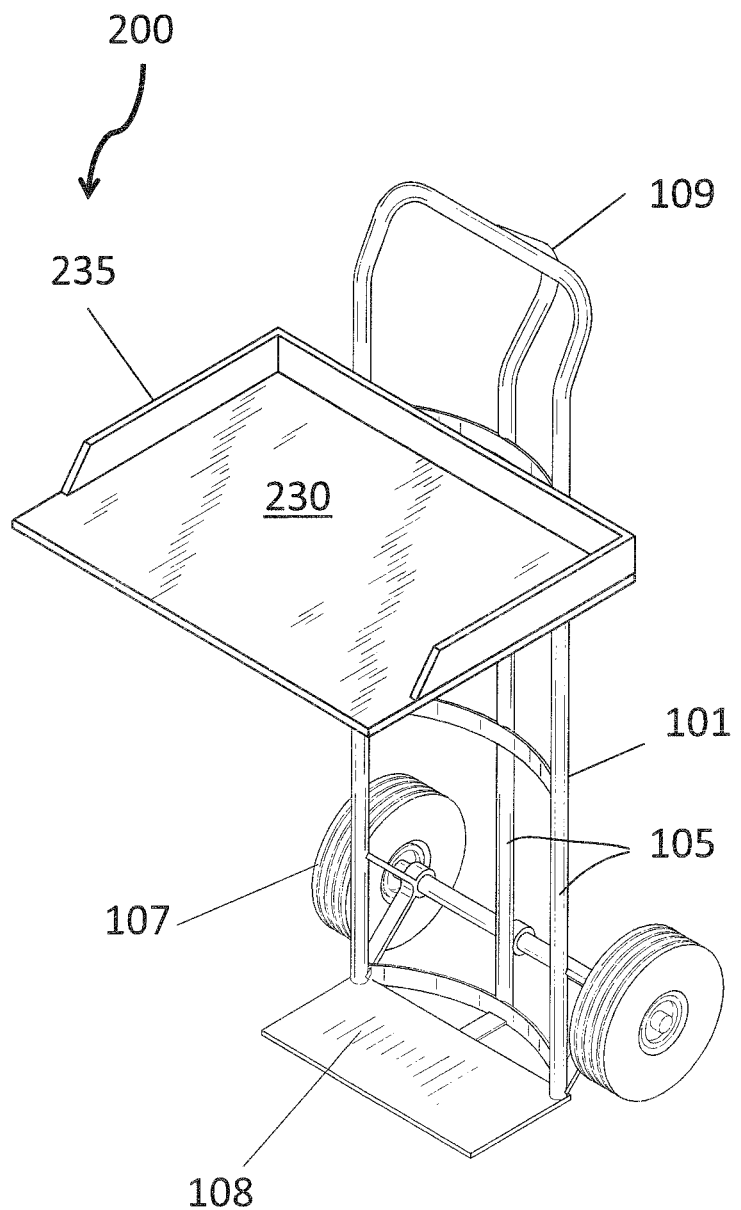
FIG. 2B is perspective view of the worktable of FIG. 2A as attached to a dolly cart.

Referring now to FIG. 2A and FIG. 2B, the worktable 200 of the kit 100 of the present invention may be attached to a top part of the dolly cart 101, for example to the rails 105. The workbench 200 comprises a generally flat panel 230, which functions as a surface on which a user can work. One or more side walls 235 may extend upwardly (e.g., generally perpendicularly) from the panel 230. A V-shaped support bar 250 is used for attaching the worktable 200 to the dolly cart frame (rails 105).

In some embodiments, securing component (e.g., a bolt 245, e.g., a bolt 245 and a wing nut 255 for tightening) is driven through the mounting holes in the V-shaped support bar 250 and into the worktable 200. Wing nuts 255 are for tightening. In some embodiments, the V-shaped support bar 250 is attached to a support component 240 disposed on the panel 230 of the worktable 200. The support component 240 may be disposed on a first edge of the panel 230. As shown in FIG. 2A, in some embodiments, the support component 240 extends downwardly from the panel 230 of the worktable 200. In some embodiments, the securing component (e.g., a bolt 245, e.g., a bolt 245 and a wing nut 255 for tightening) is secured in the mounting holes of the curved connection support 250 or panel 230 of the worktable 200 via wing nuts 255.

Figure 3A:
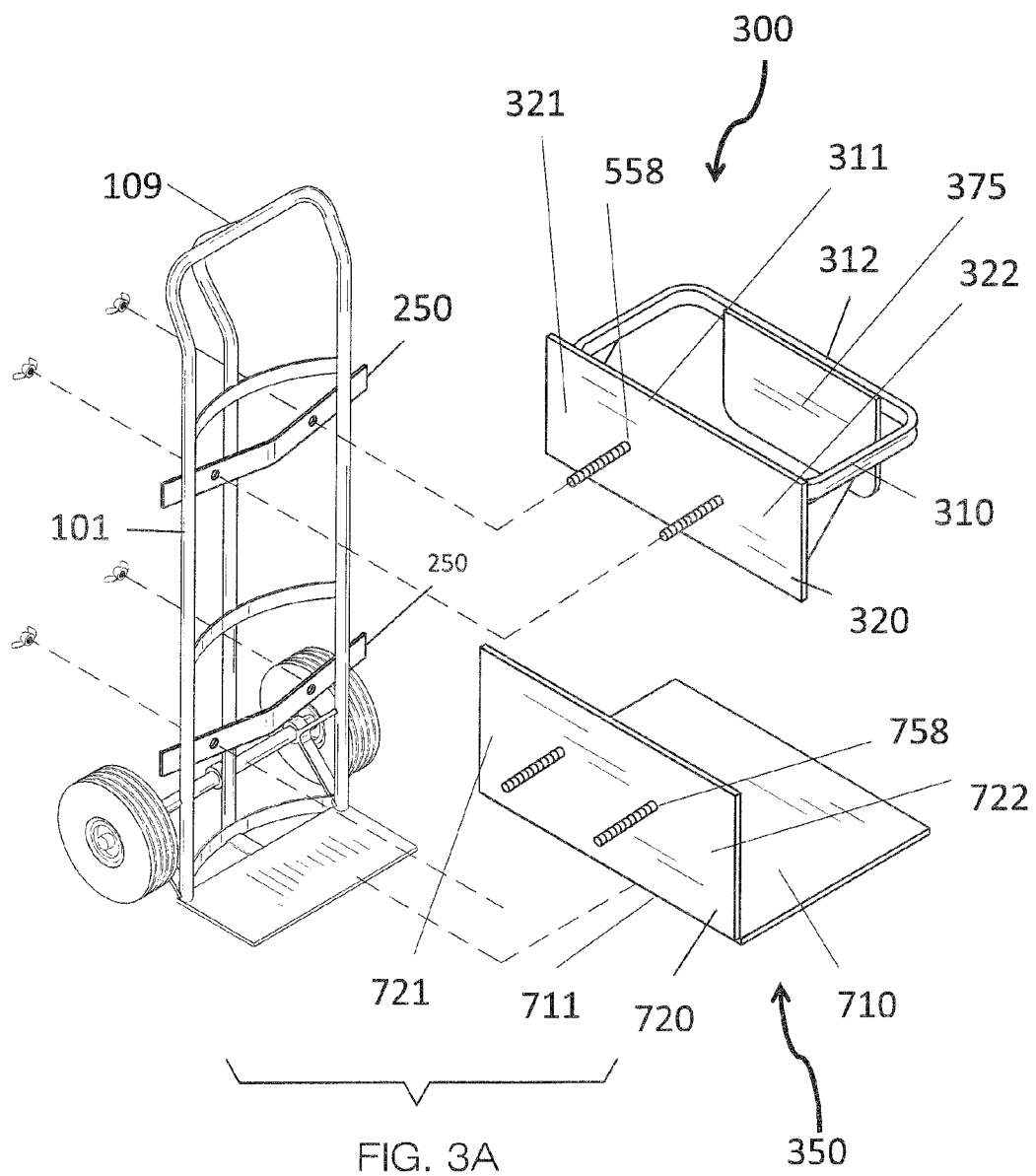
FIG. 3A is an exploded view of a garbage receptacle holder of the kit of the present invention and a dolly cart.
Figure 3B:
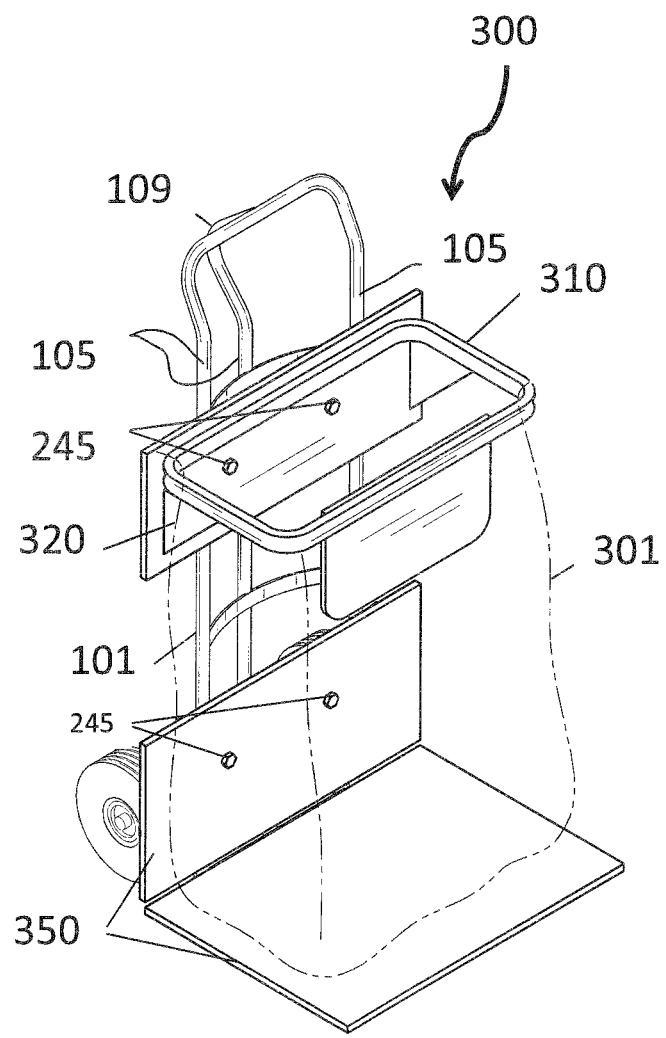
FIG. 3B is a perspective view of the garbage receptacle holder of FIG. 3A as attached to a dolly cart.

Referring now to FIG. 3A and FIG. 3B, the kit 100 of the present invention further comprises a garbage receptacle holder 300. The garbage receptacle holder 300 may be attached to a top part of the front of the dolly cart 101. The garbage receptacle holder 300 may allow a user to hold a garbage receptacle or bag 301 in an open position.

In some embodiments, the garbage receptacle holder 300 comprises a ring component 310. The ring component 310 may be generally oval, circular, rectangular, or irregular in shape. The ring component 310 is attached to a support component 320, wherein the support component is used in combination with the V-shaped support bar 250 to attach the garbage receptacle holder 300 to the dolly cart 101. In some embodiments, the support component 320 is a panel that is generally perpendicularly attached to the ring component 310 (see FIG. 3). The garbage receptacle holder 300 can be attached to the dolly cart 101 with the V-shaped support bar 250 in the same manner the worktable 200 is attached (e.g., with a bolt 245, mounting holes, wing nuts 255).

A garbage receptacle or bag 301 may be inserted into the ring component 310. In some embodiments, a front flap is disposed on a front portion of the ring. The front flap extends downwardly toward the bottom portion of the dolly cart 101 (e.g., toward the wheels 107). The front flap may be used to help keep a garbage bag 301 in an open position.

In some embodiments, a base support 350 is attached to the bottom portion of the dolly cart 101 (e.g., near the base platform 108). The base support 350 may be attached to the dolly cart 101 with another V-shaped support bar 250 (see FIG. 3A). For example, the base support 350 can be attached to the dolly cart 101 with a V-shaped support bar 250 in the same manner the worktable 200 or garbage receptacle holder 300 is attached (e.g., with bolts 245, mounting holes, wing nuts 255). The base support 350 may help to support the bag 301 or garbage receptacle. In some embodiments, the kit 100 further comprises one or more bungee cords for helping to hold the garbage receptacle or bag 301 in place on the ring component 310.

Figure 4A:
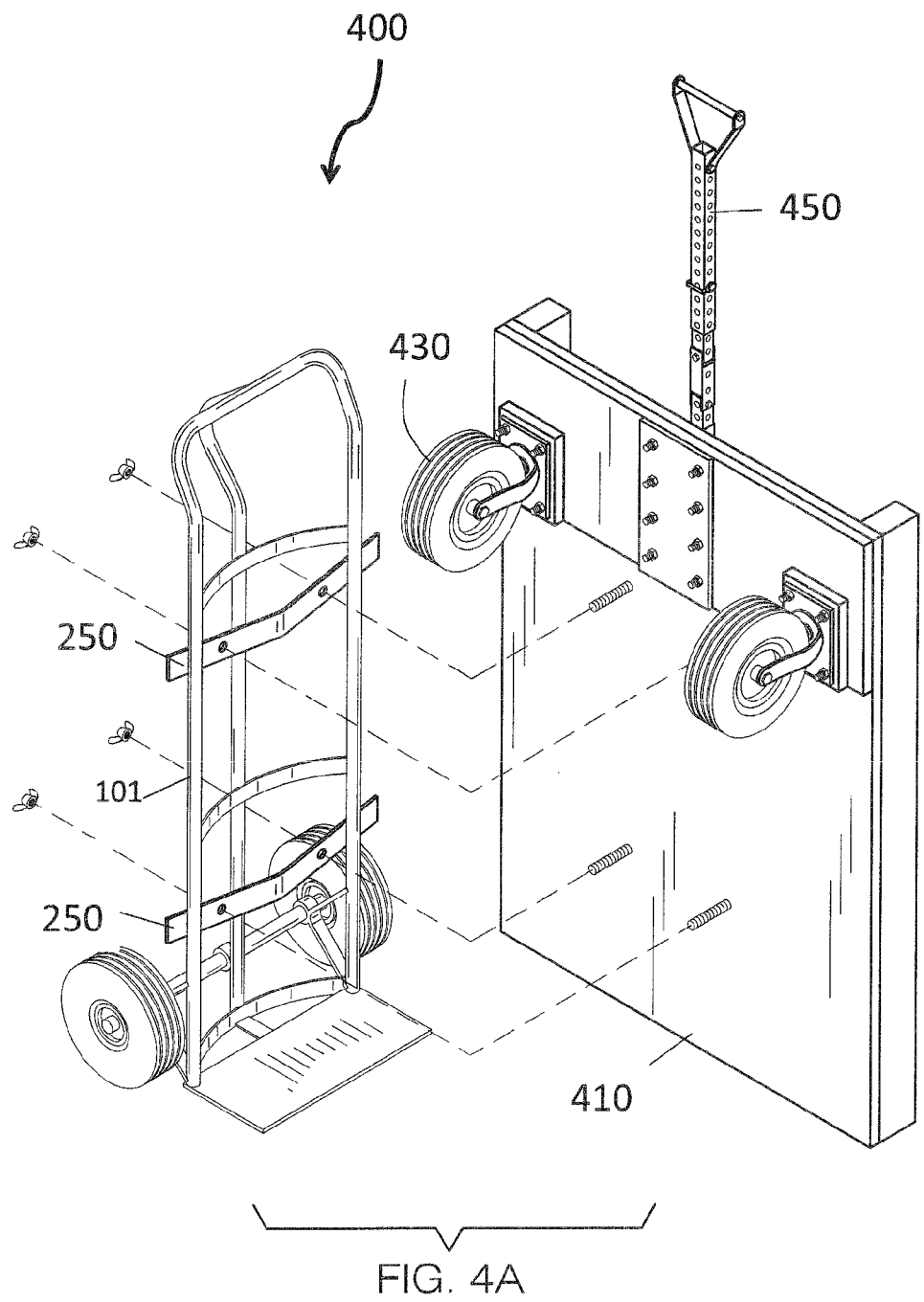
FIG. 4A is an exploded view of a wagon of the kit of the present invention and a dolly cart.
Figure 4B:
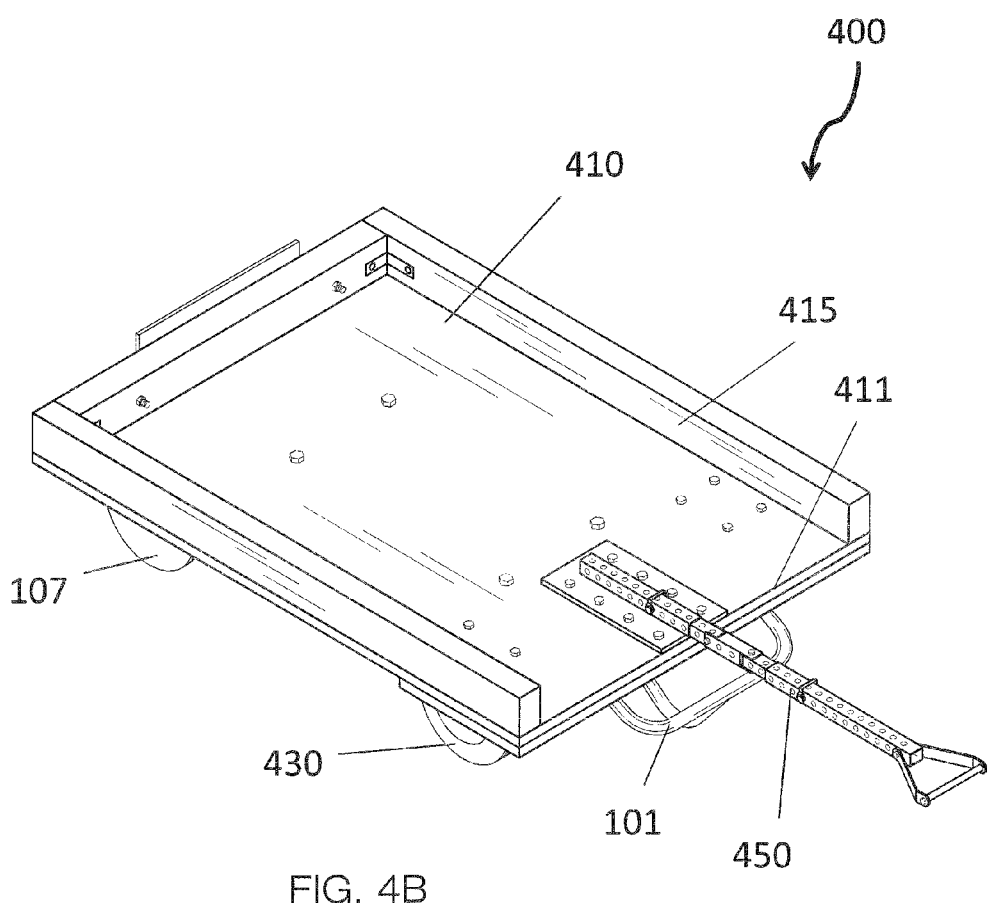
FIG. 4B is a perspective view of the wagon of FIG. 4A as attached to the dolly cart.

Referring now to FIG. 4A and FIG. 4B, the kit 100 of the present invention may further comprise a wagon 400 for attaching to the dolly cart 101 (e.g., with one or more V-shaped support bars 250). The dolly cart 101 may be laid down on a ground surface and the wagon 400 attached to the dolly cart 101 lengthwise (e.g., the wagon 400 runs from near the base platform 108 of the dolly cart 101 to near the handle 109 of the dolly cart.

The wagon 400 comprises a main panel 410 with one or more side walls extending upwardly from the main panel 410. Attached to the bottom surface of the main panel 410 is a pair of wheels 430. The wheels 430 are positioned on opposite sides and both are positioned near a first end of the main panel 410. The wheels 430 complement the wheels 107 of the dolly cart 101 (see FIG. 4B). The V-shaped support bar 250 can be used to attach the wagon 400 (the main panel 410 of the wagon 400) to the dolly cart 101 by sandwiching the frame of the dolly cart 101. Disposed on the first end of the main panel 410 (or a side wall at the first end of the main panel 410) is a handle 450. The handle 450 may be pivotally attached to the main panel 410. The handle 450 may be a flexible handle.

In some embodiments, the wagon 400 allows the dolly cart 101 to be hauled by a vehicle such as a garden tractor. In some embodiments, the handle 450 comprises a trailer hitch assembly for attaching to a trailer hitch.

Figure 5:
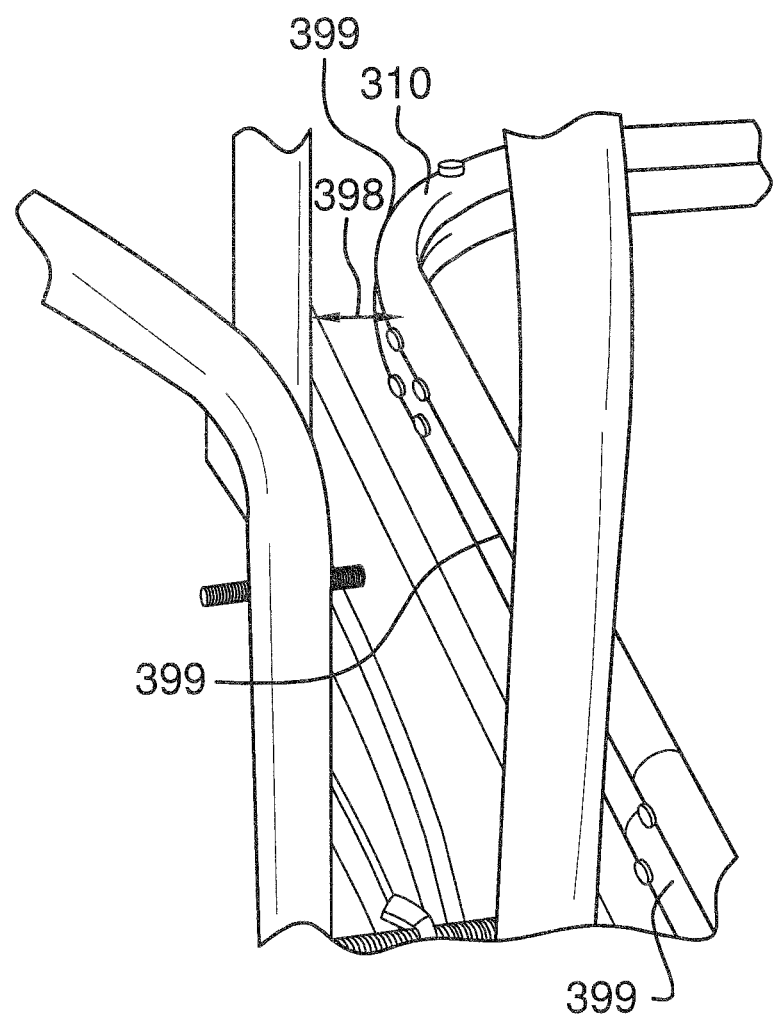
FIG. 5 is a detailed view of the ring component.

As shown in FIG. 5, in some embodiments, a valley 399 is disposed in the outer surface of the ring component 310. The valley 399 can accommodate a bungee cord. The bungee cord can be wrapped around the ring component 310 and secured by the valley 399. This can help secure a garbage bag.

As shown in FIG. 5, in some embodiments, a gap 398 (e.g., about one inch) exists between the rails 105 of the dolly cart 101 and the ring component 310. The gap 398 (e.g., about one inch) helps allow a bungee cord to be attached around the outside of the ring component 310 (e.g., adequate room is provided with the gap so as to allow a user to wrap a bungee around the ring component 310).

The following the disclosures of the following U.S. Patents are incorporated in their entirety by reference herein: U.S. Pat. No. 4,805,858; U.S. Pat. No. 4,124,185; U.S. Pat. No. 7,458,600; U.S. Pat. No. 3,992,034; U.S. Pat. No. 3,756,548; U.S. Pat. No. 6,126,183.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A kit (100) comprising:
  a worktable (200) comprising a panel (230) and a first support component (240), the first support component (240) is a flange that extends downwardly from a first edge (231) of the panel (230) of the worktable (200), wherein a first mounting hole (458) is disposed in each a first side (241) of the first support component (240) and a second side (242) of the first support component (240), the first mounting holes (458) are adapted to accommodate a bolt (245);
  a garbage receptacle holder (300) for supporting a garbage receptacle (301) in an open position, the garbage receptacle holder (300) comprises a ring component (310) and a second support component (320), the second support component (320) is a flange that extends downwardly from a first edge (311) of the ring component (310), wherein a second mounting hole (558) is disposed in each a first side (321) of the second support component (320) and a second side (322) of the second support component (320), the second mounting holes (558) are adapted to accommodate a bolt (245); and
  a V-shaped support bar (250) for rigidly attaching the worktable (200) or the garbage receptacle holder (300) to a dolly cart (101), wherein a third mounting hole (258) is disposed in each a first half (251) and a second half (252) of the V-shaped support bar (250), the third mounting holes (258) are adapted to accommodate a bolt (245).

2. The kit (100) of claim 1 further comprising wing nuts (255) for tightening.

3. The kit (100) of claim 1, wherein a side wall (235) extends upwardly from at least one side edge of the panel (230) of the worktable (200).

4. The kit (100) of claim 1, wherein a front flap (375) extends downwardly from a second edge (312) of the ring component (310), the second edge (312) being opposite the first edge (311).

5. The kit (100) of claim 1 further comprising a second V-shaped support bar (250) and a base support (350), the base support (350) comprises a base support panel (710) and a third support component (720), the third support component (720) is a flange that extends downwardly from a first edge (711) of the base support panel (710), wherein a fourth mounting hole (758) is disposed in each a first side (721) of the third support component (720) and a second side (722) of the third support component (720), the fourth mounting holes (758) are adapted to accommodate a bolt (245).

6. The kit (100) of claim 1 further comprising a second V-shaped support bar (250) and a wagon (400), the wagon (400) comprises a main panel (410) and a pair of wheels (430) attached to a bottom surface of the main panel, the wheels (430) are positioned on opposite sides and are positioned near a first end (411) of the main panel (410).

7. The kit (100) of claim 6, wherein the wagon (400) further comprises a side wall (415) extending upwardly from at least one side edge of the main panel (410).

8. The kit (100) of claim 6, wherein a handle (450) is pivotally attached to the main panel (410) of the wagon (400).

9. A system comprising:
  a worktable (200) comprising a panel (230) being generally flat and a first support component (240), the first support component (240) is a flange that extends downwardly from a first edge (231) of the panel (230) of the worktable (200), wherein a first mounting hole (458) is disposed in each a first side (241) of the first support component (240) and a second side (242) of the first support component (240);
  a V-shaped support bar (250) for rigidly attaching the worktable (200) or the garbage receptacle holder (300) to a dolly cart (101), wherein a third mounting hole (258) is disposed in each a first half (251) and a second half (252) of the V-shaped support bar (250), the third mounting holes (258) each accommodate a bolt (245); and a dolly cart (101);

wherein the V-shaped support bar (250) and the first support component (240) together sandwich rails (105) of the dolly cart (101) and bolts (245) are driven through first the second mounting holes (258) followed by the first mounting holes (458) so as to attach the worktable (200) to the dolly cart (101).

10. The system of claim 9, wherein wing nuts (255) are attached to the bolts (245) for tightening.

11. The system of claim 9, wherein a side wall (235) extends upwardly from at least one side edge of the panel (230) of the worktable (200).

12. A system comprising:

a garbage receptacle holder (300) for supporting a garbage receptacle (301) in an open position, the garbage receptacle holder (300) comprises a ring component (310) and a second support component (320), the second support component (320) is a flange that extends downwardly from a first edge (311) of the ring component (310), wherein a second mounting hole (558) is disposed in each a first side (321) of the second support component (320) and a second side (322) of the second support component (320);

a V-shaped support bar (250) for rigidly attaching the worktable (200) or the garbage receptacle holder (300) to a dolly cart (101), wherein a third mounting hole (258) is disposed in each a first half (251) and a second half (252) of the V-shaped support bar (250), the third mounting holes (258) each accommodate a bolt (245); and a dolly cart (101);

wherein the V-shaped support bar (250) and the second support component (320) together sandwich rails (105) of the dolly cart (101) and bolts (245) are driven through first the third mounting holes (258) followed by the second mounting holes (558) so as to attach the garbage receptacle holder (300) to the dolly cart (101).

13. The system of claim 12, wherein wing nuts (255) are attached to the bolts (245) for tightening.

14. The system of claim 12 further comprising a second V-shaped support bar (250) and a base support (350), the base support (350) comprises a base support panel (710) and a third support component (720), the third support component (720) is a flange that extends downwardly from a first edge (711) of the base support panel (710), wherein a fourth mounting hole (758) is disposed in each a first side (721) of the third support component (720) and a second side (722) of the third support component (720), the fourth mounting holes (758) are adapted to accommodate a bolt (245), wherein the second V-shaped support bar (250) and the third support component (720) together sandwich rails (105) of the dolly cart (101) and bolts (245) are driven through first the third mounting holes (258) of the second V-shaped support bar (250) followed by the fourth mounting holes (758) so as to attach the base support (350) to the dolly cart (101).

15. The system of claim 12, wherein a front flap (375) extends downwardly from a second edge (312) of the ring component (310), the second edge (312) being opposite the first edge (311).

* * * * *